United States Patent
Wyatt et al.

(10) Patent No.: US 7,321,369 B2
(45) Date of Patent: Jan. 22, 2008

(54) METHOD AND APPARATUS FOR SYNCHRONIZING PROCESSING OF MULTIPLE ASYNCHRONOUS CLIENT QUEUES ON A GRAPHICS CONTROLLER DEVICE

(75) Inventors: David A. Wyatt, San Jose, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 10/232,285

(22) Filed: Aug. 30, 2002

(65) Prior Publication Data
US 2004/0041814 A1 Mar. 4, 2004

(51) Int. Cl.
*G09G 5/36* (2006.01)
*G06F 1/00* (2006.01)

(52) U.S. Cl. ............... 345/556; 345/558; 345/522

(58) Field of Classification Search ............. 345/556, 345/522, 558; 712/216, 219, 222, 223, 224
See application file for complete search history.

(56) References Cited

U.S. PATENT DOCUMENTS

| | | | | |
|---|---|---|---|---|
| 5,560,029 | A | * | 9/1996 | Papadopoulos et al. ........ 712/25 |
| 6,065,126 | A | * | 5/2000 | Tran et al. ................... 713/401 |
| 6,247,064 | B1 | * | 6/2001 | Alferness et al. ........... 719/312 |
| 6,493,741 | B1 | * | 12/2002 | Emer et al. .................. 718/107 |

* cited by examiner

*Primary Examiner*—Kee M. Tung
*Assistant Examiner*—Hau H Nguyen
(74) *Attorney, Agent, or Firm*—Blakely, Sokoloff, Taylor & Zafman LLP

(57) ABSTRACT

An apparatus and method are disclosed for synchronization of command processing from multiple command queues. Various embodiments employ a condition code register that indicates which queues should have processing suspended until a specified event condition occurs. Upon satisfaction of the specified condition, processing of commands from the suspended queue is resumed.

24 Claims, 6 Drawing Sheets

METHOD AND APPARATUS FOR SYNCHRONIZING PROCESSING OF MULTIPLE ASYNCHRONOUS CLIENT QUEUES ON A GRAPHICS CONTROLLER DEVICE

FIELD

The embodiments disclosed herein relate generally to instruction processing, and more particularly to synchronizing instruction processing from multiple instruction queues.

BACKGROUND

Rapid generation of three-dimensional images is becoming increasingly important to many computer applications. For instance, games and entertainment software use three-dimensional graphics to increase the realism of the images displayed to the user. Businesses use three-dimensional graphics to increase the effectiveness of business presentations and data analysis. In addition, medical devices can advantageously utilize three-dimensional images to improve medical diagnosis and treatment.

Many devices that generate three-dimensional images utilize a queued architecture in which commands (e.g., instructions) to be executed are put into a queue. A command parser reads the queue (e.g., fetches commands from the queue), processes the commands, and passes the commands on to a rendering engine. The rendering engine renders the images and passes the output to a display such as a monitor or other display mechanism.

In some devices, multiple queues are used to store commands and feed commands to a shared command parser. The queues can each be fed commands by a different data stream/thread, and often, each queue is assigned a priority level in order to insure that more important commands are processed before less important commands. In addition, each queue can be associated with one of several displays connected to the shared rendering engine, which will render images for each display.

In such devices, certain commands must be processed before other commands that are dependent on the results of the earlier commands. For instance, some devices have a binner to condition the processed commands output from the command parser. One example of conditioning would be the binner computing the vertices of a polygon and feeding the vertices to the rendering engine for rendering. Thus, the binner must complete computation of the vertices before the rendering engine can proceed.

Currently, when such a dependency is necessary to properly render an image, a device will process commands in a serial nature to insure that the proper order is followed. However, serial processing is inefficient and limits the display capabilities of devices that have multiple queues feeding commands to one or more rendering engines.

DESCRIPTION OF THE DRAWINGS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTION

In the following description, for the purposes of explanation, numerous specific details are set forth in order to provide a thorough understanding of the various embodiments. It will be apparent, however, to one skilled in the art that the embodiments may be practiced without some of these specific details. The following description and the accompanying drawings provide examples for the purposes of illustration. However, these examples should not be construed in a limiting sense as they are not intended to provide an exhaustive list of all possible implementations.

Figure 1:
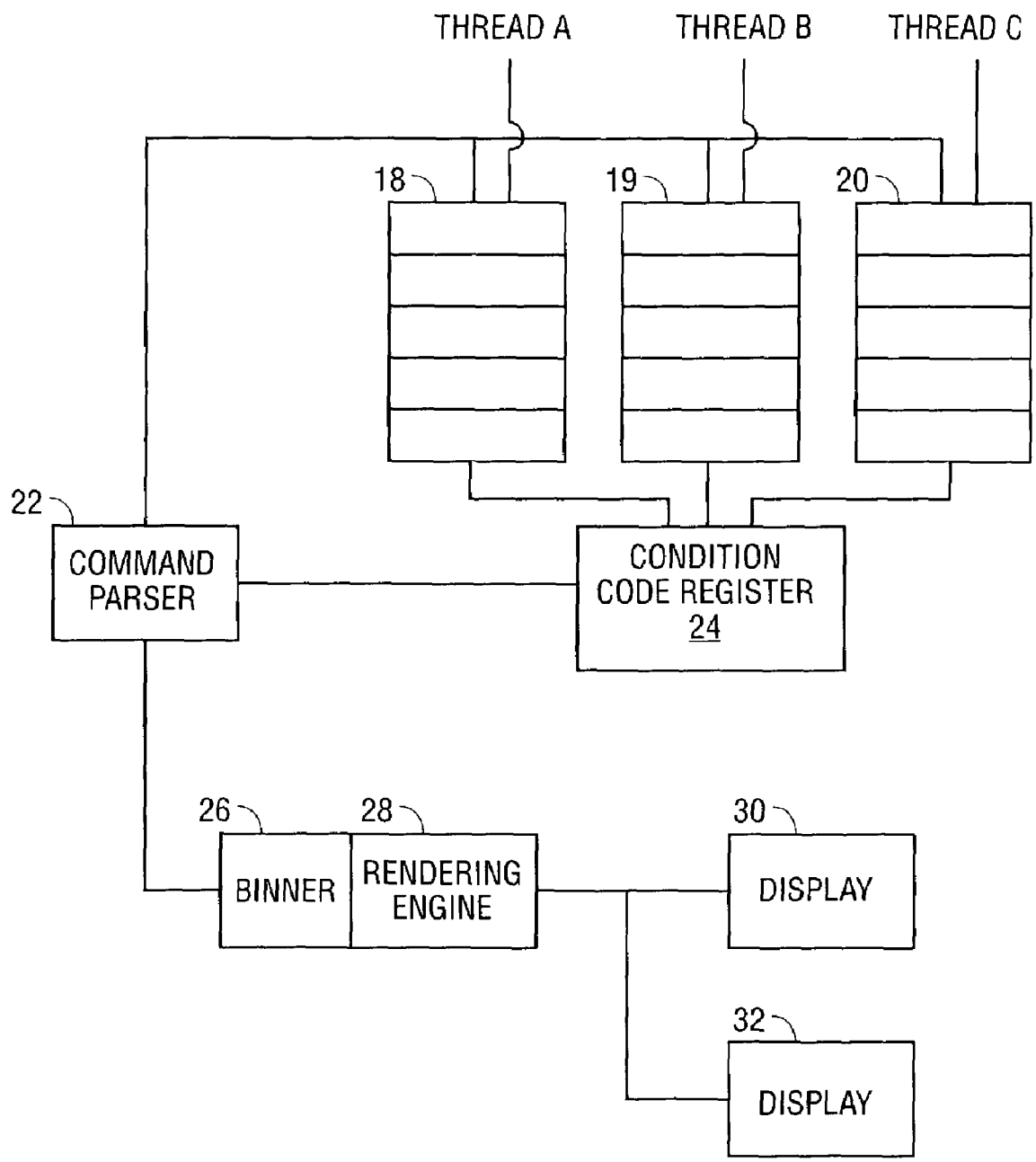
FIG. 1 is a device according to an embodiment which utilizes a condition code register to synchronize multiple queues.

Referring now to FIG. 1, an embodiment is shown that has a plurality of queues. Each queue is shown to receive commands from a single thread (e.g., data stream). In various embodiments, the commands are for rendering graphic images on a display. Each queue stores the commands received from the thread assigned to feed the queue. Specifically, first queue 18 receives commands from Thread A, second queue 19 receives commands from Thread B, and third queue 20 receives commands from Thread C. Although FIG. 1 depicts each queue only receiving commands from a single thread, it is contemplated that each queue could receive commands from any number and combination of the threads.

The queues are coupled to command parser 22. Command parser 22 fetches the commands from the plurality of queues. This can be accomplished in several different manners. For example, command parser 22 can be configured to fetch commands based on an arbitration scheme in which certain queues have higher priority than others. Alternatively, a time slicing method could be used in which command parser 22 fetches commands from first queue 18 for a certain period of time, moves to second queue 19 for a period of time, continues on to third queue 20 for a period of time, and repeats the process as necessary.

Regardless of the arbitration scheme utilized, command parser 22 processes the commands and prepares the commands to be sent to rendering engine 28 for rendering. The embodiment shown in FIG. 1 has binner 26 coupled to rendering engine 28 to condition (e.g., conduct pre-work such as calculation of vertices) data received from command parser 22. After rendering engine 28 renders an image based on the data received from command parser 22 and binner 26, rendering engine 28 outputs the image to a display.

In the embodiment shown, rendering engine 28 outputs images to first display 30 and second display 32. The images sent to each display can be the same or may only vary by the refresh/scan rate for each display. Alternatively, different images may be sent to each display.

The plurality of queues and command parser 22 are coupled to condition code register 24. Condition code register 24 stores a range of event conditions, which are indicated by at least one condition code bit. In various embodiments, each condition code bit can represent a specific condition. Processing of commands between two or more queues can be synchronized by inserting specific commands into the plurality of queues to set the condition code bits.

One type of synchronization is accomplished by the following procedure. First, a wait-on-event ("WOE") command is placed into a queue. When command parser 22 fetches the WOE command from the queue, at least one condition code bit is overwritten in condition code register 24. The WOE command instructs command parser 22 to suspend processing until the condition specified by the condition code bit set by the WOE command has occurred.

The suspension of processing by command parser 22 varies depending on the queue that sourced the WOE command. If the source queue is a batch buffer, processing will be suspended until the specified condition occurs, as indicated by condition code register 24. If the source queue is a ring buffer or a linear first-in, first-out buffer, only processing from the source queue will be suspended while processing from the other queues continues.

In order to resume processing in the same manner as before the WOE command was encountered, a release command is placed into another queue such that command parser 22 will not fetch the release command until the condition specified by the WOE command has been satisfied. In various embodiments, the release command is placed into the appropriate queue by a data thread either before or during command fetching and processing conducted by command parser 22. When command parser 22 fetches the release command, the condition code bit that corresponds with the condition specified by the WOE command is cleared, which allows command parser 22 to resume processing.

Figure 2:
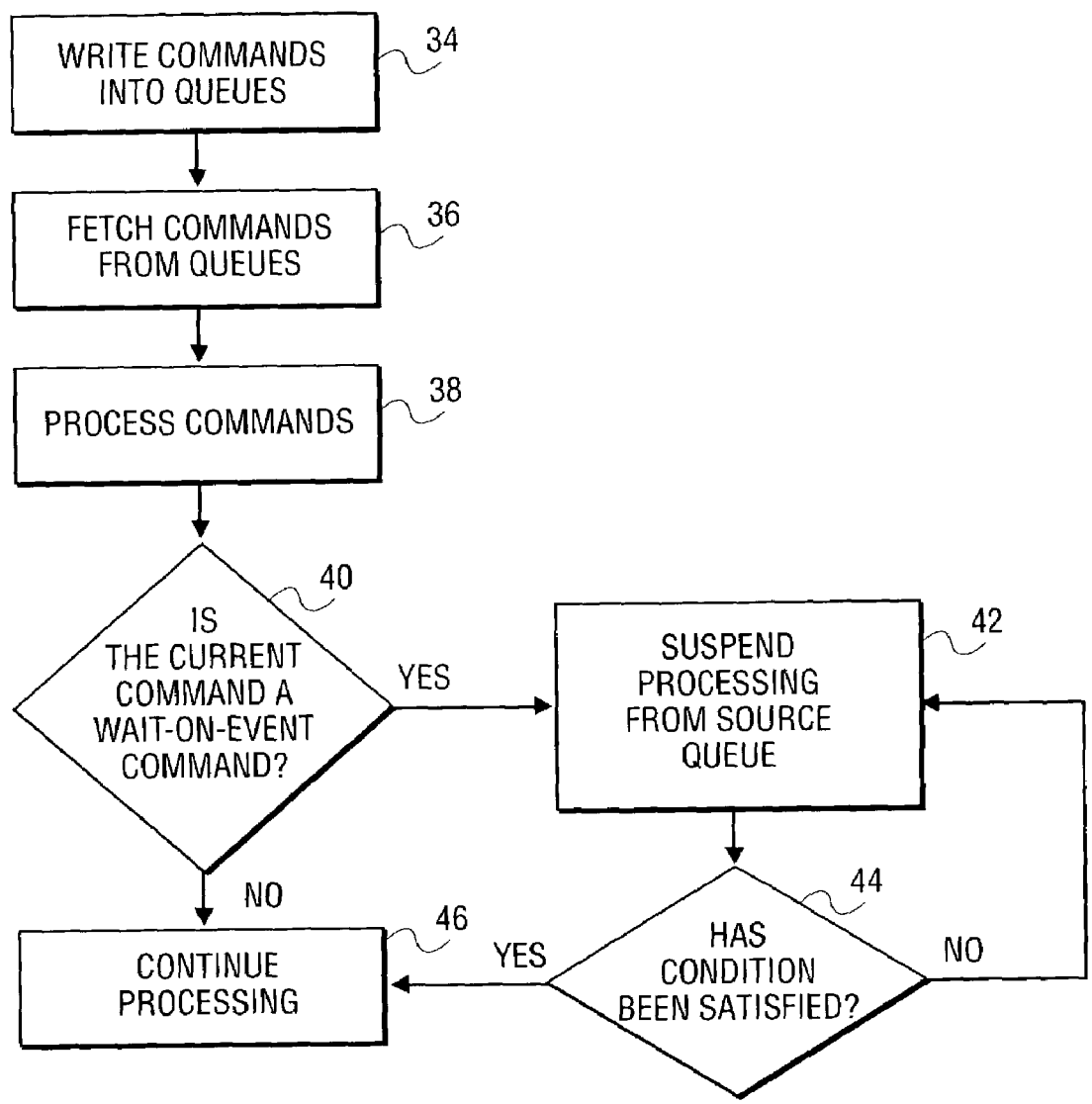
FIG. 2 is a flowchart which illustrates the how a condition code register synchronizes processing between queues.

The general process flow for synchronization of various embodiments is shown in FIG. 2. At block 34, commands are written from at least one thread into a plurality of queues. The commands are then fetched from the queues at block 36. The fetched commands are processed at block 38, and at decision block 40, it is determined whether the current command is a WOE command.

If the command is not a WOE command, processing continues at block 46. If the command is a WOE command, processing is suspended from the queue that sourced the WOE command at block 42. At decision block 44, it is determined whether the condition specified by the WOE command has been satisfied (e.g., occurred). If not, processing remains suspended from the source queue at block 42. However, if the condition has been satisfied, processing from the source queue resumes at block 46.

Figure 3:
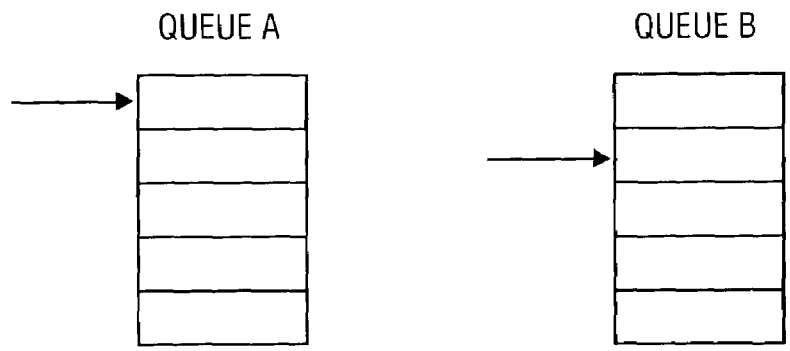
FIG. 3 illustrates Queue A and Queue B processing asynchronously.

FIGS. 3-6 show an example of an embodiment with two queues (e.g., Queue A and Queue B) and the interaction that takes place to accomplish synchronization. The arrow in the figures represents where the command parser is extracting commands from each queue at a given time. In FIG. 3, commands from Queue A and Queue B are being processed asynchronously.

Figure 4:
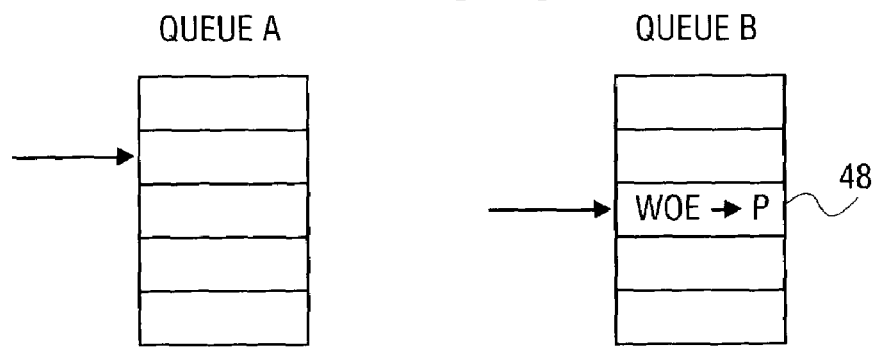
FIG. 4 illustrates Queue B writing a wait-on-event command to a condition code register while Queue A continues processing.

In FIG. 4, command 48 is a WOE command that indicates that processing from Queue B should be suspended until condition P is satisfied. Thus, the appropriate condition code bit(s) in the condition code register will be overwritten to instruct the command parser to suspend processing until the appropriate condition code bit(s) is cleared. In various embodiments, a mask field in the WOE command will indicate which bits of the condition code register are to be overwritten.

Figure 5:
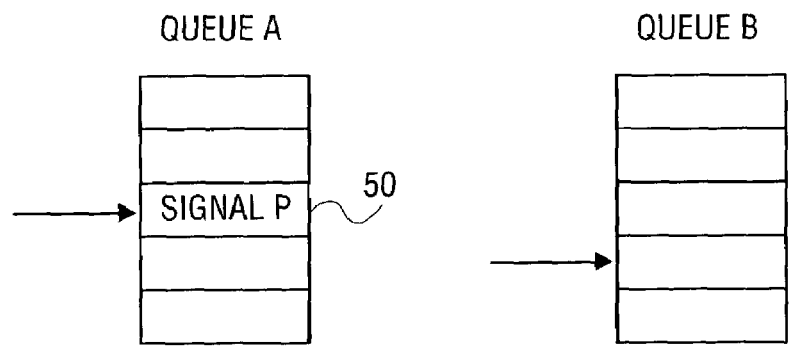
FIG. 5 illustrates Queue A signaling the condition code register (e.g., writing the correct condition code) to release Queue B from a suspended state.
Figure 6:
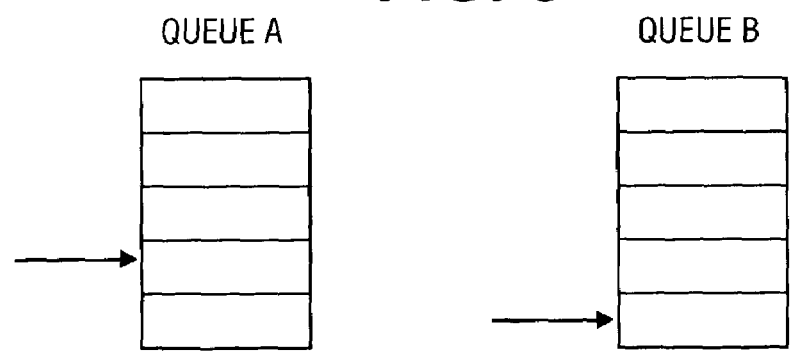
FIG. 6 illustrates Queue A and Queue B processing once again.

FIG. 5 shows release command 50 in Queue A, which specifies that condition P is now satisfied. Upon receipt of release command 50, the command parser will clear the appropriate condition code bit(s) from the condition code register, which will release Queue B from a suspended state. FIG. 6 shows commands being processed from Queue A and Queue B once again.

Figure 7:
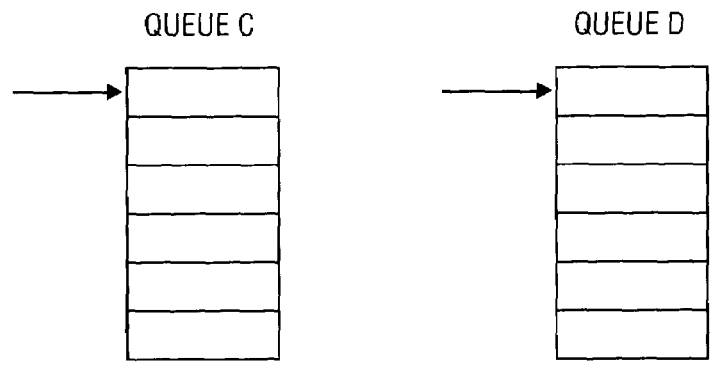
FIG. 7 illustrates Queue C and Queue D processing asynchronously.
Figure 8:
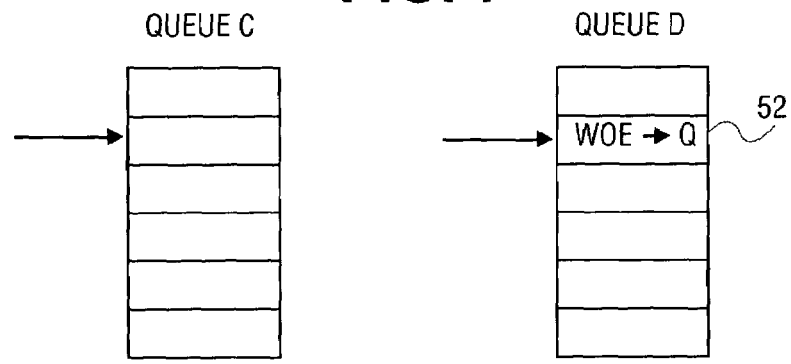
FIG. 8 illustrates Queue D writing a wait-on-event command to a condition code register while Queue C continues processing.
Figure 9:
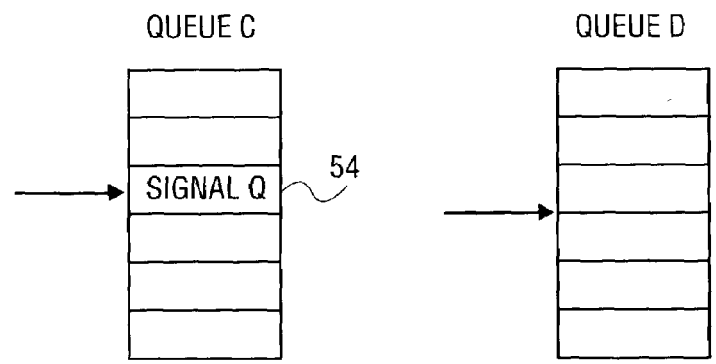
FIG. 9 illustrates Queue C signaling the condition code register to release Queue D from a suspended state.

FIGS. 7-12 show another example of synchronization between two queues. In FIG. 7, commands from Queue C and Queue D are being processed asynchronously. FIG. 8 shows that command 52 in Queue D is a WOE command that indicates that processing from Queue D should be suspended until the occurrence of condition Q. Release command 54 in Queue C of FIG. 9 instructs the command parser to resume processing from Queue D.

Figure 10:
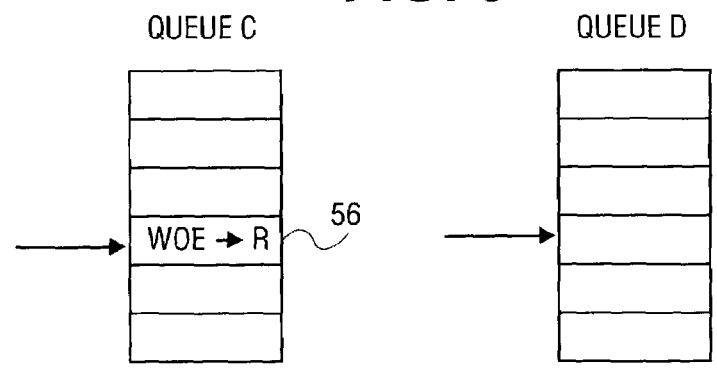
FIG. 10 illustrates Queue C writing a wait-on-event command to the condition code register while Queue D continues processing.
Figure 11:
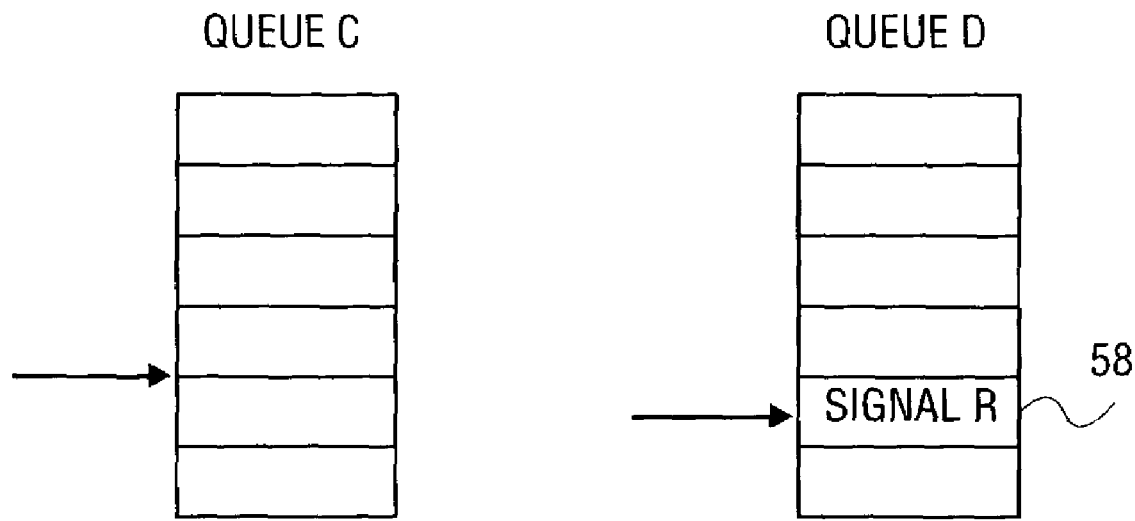
FIG. 11 illustrates Queue D signaling the condition code register to release Queue C from a suspended state.
Figure 12:
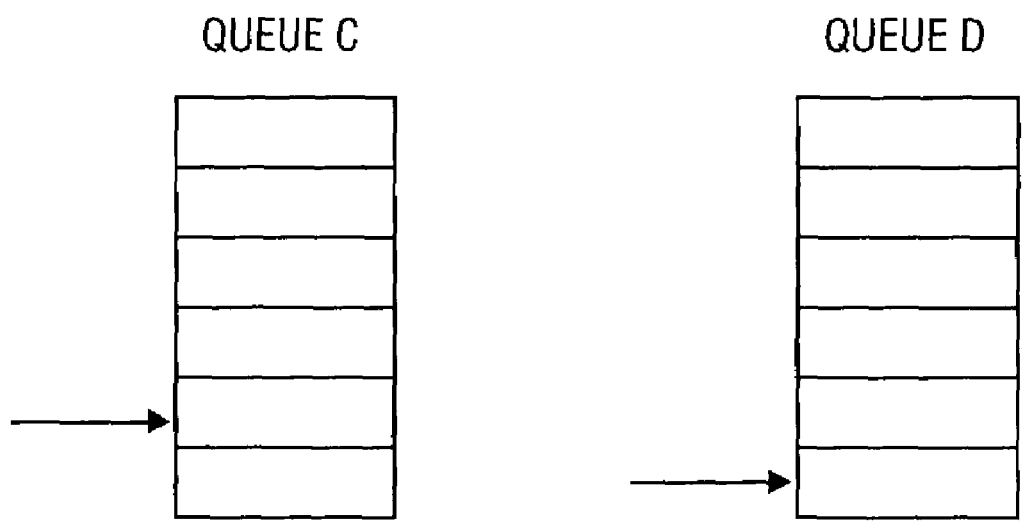
FIG. 12 illustrates Queue C and Queue D processing once again.

In FIG. 10, Queue C now has processing suspended by command 56, which is a WOE command specifying condition R as the condition that must be satisfied before processing from Queue C can resume. FIG. 11 shows release command 58 in Queue D, which signals that condition R has been satisfied so that processing from Queue C can resume. FIG. 12 shows that commands are being processed from both Queue C and Queue D once again.

The two examples shown in FIGS. 3-12 depict two-queue embodiments with only one queue having processing suspended at any given time. However, it is contemplated that more queues could be implemented and that multiple WOE commands can be issued so that processing from multiple queues can be suspended at any given time.

When suspending processing from multiple queues, various embodiments include a WOE command management unit to track which condition code bits have been set in conjunction with issued WOE commands. Since there are a finite number of condition code bits that can be utilized in the condition code register, there is a finite number of WOE commands that can be issued. Thus, after all of the available condition code bits have been utilized in conjunction with their respective WOE commands, the WOE command management unit should prevent issuance of any further WOE commands until one of the condition code bits is cleared and becomes available for use.

Without such a management unit, it would be possible that the queue synchronization could be jeopardized. For example, a redundancy problem may occur if all of the available condition code bits have been utilized by WOE commands and the command parser fetches another WOE command from a queue and sets one of the condition code bits that has already been set. In such a situation, a synchronization error may occur because two queues have separately sourced a WOE command based on the same condition. Thus, one of the queues may resume processing at the wrong time if the condition code bit(s) is cleared at a different time than expected.

The WOE command management unit can be, among others, a computer program (e.g., software). In various embodiments, a software driver (e.g., graphics controller device driver) utilizes Semaphores (or Mutual Exclusion devices, "Mutex") to control synchronization. Semaphores and Mutexes are software mechanisms that can be used to permit access to a resource (e.g., the command parser) by multiple clients (e.g., queues) competing for access to the shared resource. In embodiments that utilize Semaphores, the Semaphores function as WOE commands, and the software driver functions as the WOE command management unit.

Other embodiments may use a hardware-based management unit or a combination of software and hardware (e.g., firmware). Regardless of the type of management unit employed, WOE command tracking insures that a condition code bit that has been previously set will not be re-used by another queue until the condition code bit has been cleared (e.g., the specified condition has been satisfied).

Figure 13:
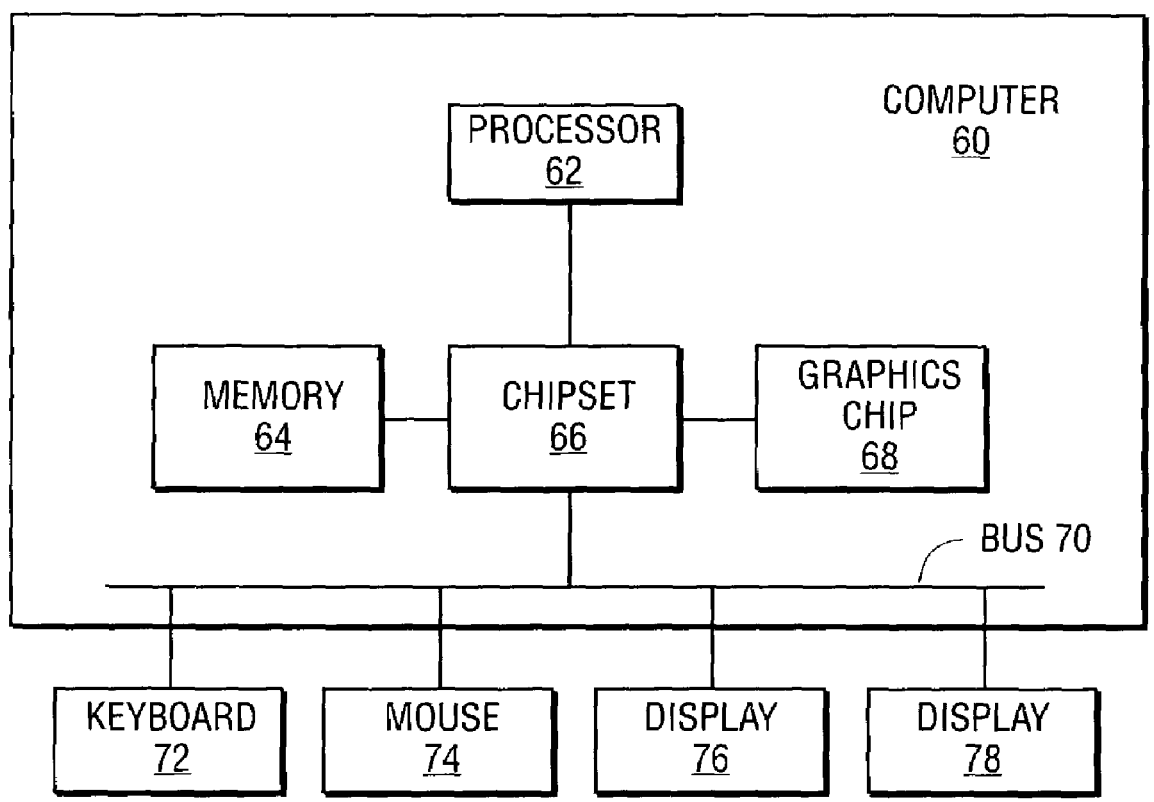
FIG. 13 is a computer system which utilizes an embodiment with the rendering engine and binner as part of a graphics chip.

FIG. 13 shows computer 60 that has processor 62 and memory 64 coupled to chipset 66. In the embodiment shown, graphics chip 68 is separate from chipset 66 and contains components for rendering images (e.g., rendering engine and binner). However, it is contemplated to have some or all of the components that comprise graphics chip 68 located in chipset 66. Regardless of the location of the components, once an image is rendered, the image data is sent over bus 70 to either or both of first display 76 and second display 78. A user can manipulate computer 60 to render images on the displays via keyboard 72 and mouse 74. Other devices, not shown, could also be used to manipulate computer 60.

Moreover, although the embodiments previously described utilize only a single command parser in conjunction with a plurality of queues, it is also contemplated to utilize a plurality of command parsers in conjunction with a plurality of queues. Regardless of the number of command parsers and queues utilized, the synchronization enabled by the embodiments disclosed herein increases the efficiency in rendering images and improves the balance between central processing unit development of rendering commands and rendering engine processing of the rendering commands.

Various embodiments disclosed herein include software on a machine-readable medium. A machine-readable medium includes any mechanism that provides (e.g., stores and/or transmits) information in a form readable by a machine (e.g., a computer). For example, a machine-readable medium includes read only memory; random access memory; magnetic disk storage media; optical storage media; flash memory devices; and electrical, optical, acoustical or other forms of propagated signals (e.g., carrier waves, infrared signals, digital signals).

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

We claim:
1. An apparatus comprising:
   a plurality of queues, each queue to store commands;
   a command parser coupled to the plurality of queues to fetch and process the commands stored in the plurality of queues; and
   a condition code register coupled to the plurality of queues and to the command parser, the condition code register to store a range of event conditions indicated by at least one condition code bit, and upon receipt of a wait-on-event command, to instruct the command parser to at least partially suspend command processing until a specified condition occurs, wherein the wait-on-event command comprises:
   at least one mask bit to indicate which bits of the condition code register are to be overwritten; and
   at least one condition code bit to be written into the condition code register as dictated by the mask bits, the condition code bit to indicate the specified condition that will allow the command parser to resume command processing.

2. The apparatus of claim 1, wherein the wait-on-event command is to be stored in one of the plurality of queues.

3. The apparatus of claim 2, wherein the queue that sources the wait-on-event command comprises a batch buffer, and wherein upon fetching the wait-on-event command, the command parser suspends command processing until the specified condition occurs.

4. The apparatus of claim 2, wherein the queue that sources the wait-on-event command comprises one of a ring buffer and a linear first-in, first-out buffer, and wherein upon fetching the wait-on-event command, the command parser suspends command processing from the source queue but continues to process commands from the other queues.

5. The apparatus of claim 1, further comprising:
   a wait-on-event command management unit to track which condition code bits have been set in conjunction with a fetched wait-on-event command to prevent redundant usage of any particular condition code bit.

6. The apparatus of claim 5, wherein the wait-on-event command management unit comprises:
   a computer program.

7. A system comprising:
   a plurality of queues, each queue to store commands;
   a command parser coupled to the plurality of queues to fetch and process the commands stored in the plurality of queues;
   a rendering engine coupled to the command parser, the render engine to receive and process data from the command parser;
   a display coupled to the rendering engine, the display to display output from the rendering engine; and
   a condition code register coupled to the plurality of queues and to the command parser, the condition code register to store a range of event conditions indicated by at least one condition code bit, and upon receipt of a wait-on-event command, to instruct the command parser to at least partially suspend command processing until a specified condition occurs, wherein the wait-on-event command comprises:
   at least one mask bit to indicate which bits of the condition code register are to be overwritten; and
   at least one condition code bit to be written into the condition code register as dictated by the mask bits, the condition code bit to indicate the specified condition that will allow the command parser to resume command processing.

8. The system of claim 7, further comprising:
a binner coupled to the rendering engine to condition data received from the command parser before the rendering engine processes the data.

9. The system of claim 7, wherein the wait-on-event command is to be stored in one of the plurality of queues.

10. The system of claim 9, wherein the queue that sources the wait-on-event command comprises a batch buffer, and wherein upon fetching the wait-on-event command, the command parser suspends command processing until the specified condition occurs.

11. The system of claim 9, wherein the queue that sources the wait-on-event command comprises one of a ring buffer and a linear first-in, first-out buffer, and wherein upon fetching the wait-on-event command, the command parser suspends command processing from the source queue but continues to process commands from the other queues.

12. The system of claim 7, further comprising:
a wait-on-event command management unit to track which condition code bits have been set in conjunction with a fetched wait-on-event command to prevent redundant usage of any particular condition code bit.

13. The system of claim 12, wherein the wait-on-event command management unit comprises:
a computer program.

14. A method comprising:
writing commands from at least one thread into a plurality of queues;
fetching the commands from the plurality of queues;
processing the commands;
upon receipt of a wait-on-event command, at least partially suspending processing of the commands until a specified condition occurs, including writing at least one condition code bit from the wait-on-event command into a condition code register, the condition code register to store a range of event conditions, wherein receipt of the wait-on-event command comprises fetching the wait-on-event command from a source queue of the plurality of queues, and wherein partially suspending comprises ceasing command processing from the source queue but continuing to process commands from the other queues of the plurality of queues; and
outputting the processed commands to a display to be displayed as an image.

15. The method of claim 14, further comprising:
tracking which condition code bits have been set in conjunction with an issued wait-on-event command to prevent redundant usage of any particular condition code bit.

16. The method of claim 15, wherein tracking comprises:
utilizing a computer program to track the condition code bits.

17. The method of claim 14, wherein the queue that sources the wait-on-event command comprises a batch buffer and wherein suspending comprises:
ceasing command processing until the specified event occurs.

18. The method of claim 14, wherein the source queue that sources the wait-on-event command comprises one of a ring buffer and a linear first-in, first-out buffer.

19. The method of claim 14, further comprising:
outputting the processed commands to a rendering engine.

20. The method of claim 19, further comprising:
displaying output from the rendering engine on a display.

21. A machine readable storage medium containing instructions stored thereon that, when executed by a machine, cause the machine to perform operations comprising:
writing commands from at least one thread into a plurality of queues;
fetching the commands from the plurality of queues;
processing the commands; and
upon receipt of a wait-on-event command, at least partially suspending processing of the commands until a specified condition occurs, including writing at least one condition code bit from the wait-on-event command into a condition code register, the condition code register to store a range of event conditions, wherein receipt of the wait-on-event command comprises fetching the wait-on-event command from a source queue of the plurality of queues, and wherein partially suspending comprises ceasing command processing from the source queue but continuing to process commands from the other queues of the plurality of queues.

22. The machine readable storage medium of claim 21, having further instructions thereon, which further instructions, when executed by the machine, cause the machine to perform the following, comprising tracking which condition code bits have been set in conjunction with an issued wait-on-event command to prevent redundant usage of any particular condition code bit.

23. The machine readable storage medium of claim 21, wherein the queue that sources the wait-on-event command comprises a batch buffer and wherein at least partially suspending processing comprises ceasing command processing until the specified event occurs.

24. The machine readable storage medium of claim 21, wherein the queue that sources the wait-on-event command comprises one of a ring buffer and a linear first-in, first-out buffer.

* * * * *

UNITED STATES PATENT AND TRADEMARK OFFICE
CERTIFICATE OF CORRECTION

PATENT NO. : 7,321,369 B2 Page 1 of 1
APPLICATION NO. : 10/232285
DATED : January 22, 2008
INVENTOR(S) : Wyatt et al.

It is certified that error appears in the above-identified patent and that said Letters Patent is hereby corrected as shown below:

In column 7, at line 26, after "A", insert --computer-implemented--.

Signed and Sealed this

Twenty-sixth Day of August, 2008

JON W. DUDAS
*Director of the United States Patent and Trademark Office*